US010190922B2

(12) United States Patent
Eberlein

(10) Patent No.: US 10,190,922 B2
(45) Date of Patent: Jan. 29, 2019

(54) METHOD AND APPARATUS FOR CALIBRATING A SENSOR

(71) Applicant: Intel Corporation, Santa Clara, CA (US)

(72) Inventor: Matthais Eberlein, Holzkirchen (DE)

(73) Assignee: INTEL CORPORATION, Santa Clara, CA (US)

( * ) Notice: Subject to any disclaimer, the term of this patent is extended or adjusted under 35 U.S.C. 154(b) by 208 days.

(21) Appl. No.: 15/025,224

(22) PCT Filed: Dec. 6, 2013

(86) PCT No.: PCT/US2013/073728
§ 371 (c)(1),
(2) Date: Mar. 25, 2016

(87) PCT Pub. No.: WO2015/084410
PCT Pub. Date: Jun. 11, 2015

(65) Prior Publication Data
US 2016/0238464 A1    Aug. 18, 2016

(51) Int. Cl.
*G01K 15/00* (2006.01)
*G01K 7/01* (2006.01)
*G01K 1/02* (2006.01)

(52) U.S. Cl.
CPC ........... *G01K 15/005* (2013.01); *G01K 1/026* (2013.01); *G01K 7/01* (2013.01); *G01K 15/00* (2013.01)

(58) Field of Classification Search
CPC ........ G01K 15/005; G01K 1/026; G01K 7/01; G01K 15/00
See application file for complete search history.

(56) References Cited

U.S. PATENT DOCUMENTS

| | | | | |
|---|---|---|---|---|
| 5,961,215 | A * | 10/1999 | Lee | G01K 7/01 374/178 |
| 6,078,208 | A * | 6/2000 | Nolan | G01K 7/01 327/512 |
| 6,736,540 | B1 * | 5/2004 | Sheehan | G01K 7/01 327/572 |
| 6,955,164 | B2 * | 10/2005 | Kesler | F02P 3/055 123/630 |
| 6,991,369 | B1 * | 1/2006 | Garavan | G01K 3/02 327/512 |

(Continued)

OTHER PUBLICATIONS

Notification Concerning Transmittal of International Preliminary Report of Patentability issued for International Patent Application No. PCT/US2013/073728, dated Jun. 16, 2016.

(Continued)

*Primary Examiner* — Lisa Caputo
*Assistant Examiner* — Philip Cotey
(74) *Attorney, Agent, or Firm* — Womble Bond Dickinson (US) LLP

(57) ABSTRACT

Described is a current-mode thermal sensor with calibration apparatus which comprises: a first transistor with a gate terminal coupled to a first node; a second transistor with a gate terminal coupled to a second node; a first resistor coupled to the first and second nodes; a second resistor coupled to the first node and a supply node; a diode coupled to the second node and the supply node; a third resistor coupled to the second node; and a switch coupled to the third resistor and a reference supply.

23 Claims, 10 Drawing Sheets

(56) References Cited

U.S. PATENT DOCUMENTS

| | | | |
|---|---|---|---|
| 7,033,072 B2* | 4/2006 | Aota | G01K 7/01 |
| | | | 327/512 |
| 7,236,048 B1* | 6/2007 | Holloway | G05F 3/30 |
| | | | 327/512 |
| 7,410,293 B1* | 8/2008 | Santurkar | G01K 7/015 |
| | | | 327/512 |
| 7,443,226 B1* | 10/2008 | Holloway | G05F 3/30 |
| | | | 327/513 |
| 7,618,186 B2 | 11/2009 | Kwon et al. | |
| 9,071,209 B1* | 6/2015 | Harrison | G01N 33/48728 |
| 2003/0086476 A1 | 5/2003 | Mizuta | |
| 2010/0213374 A1* | 8/2010 | Meinel | G01J 5/12 |
| | | | 250/338.4 |
| 2013/0060499 A1* | 3/2013 | Yoshimura | G01K 3/14 |
| | | | 702/99 |
| 2013/0315276 A1* | 11/2013 | Segal | G01K 7/22 |
| | | | 374/1 |
| 2014/0340150 A1* | 11/2014 | Dempsey | H03F 1/223 |
| | | | 330/260 |

OTHER PUBLICATIONS

International Search Report dated Sep. 25, 2014 for PCT/US2013/073728, filed Dec. 6, 2013, 3 pages.

Written Opinion of the International Searching Authority dated Sep. 25, 2014 for PCT/US2013/073728, filed Dec. 6, 2013, 5 pages.

* cited by examiner

METHOD AND APPARATUS FOR CALIBRATING A SENSOR

RELATED APPLICATION

This patent application is a U.S. National Phase Application under 35 U.S.C. § 371 of International Application No. PCT/US2013/073728, filed Dec. 6, 2013, entitled METHOD AND APPARATUS FOR CALIBRATING A SENSOR.

BACKGROUND

Accurate sensors to monitor temperature are used for thermal management of micro-processors. Most System-on-Chip (SoC) solutions use some kind of temperature tracking, in order to optimize or control the performance of certain functions. At times, where phones merge with mobile computers, relevant applications of thermal sensors also include mixed-signal functions, like RF (radio frequency) or audio power amplifiers.

Most integrated solutions for accurate sensors are based on the temperature characteristic of bipolar junctions, namely the base-emitter voltage of parasitic bipolar junction transistors (BJTs). They include an analog-to-digital-converter (ADC) and a reference (e.g., bandgap), typically together with techniques for error correction. FIG. 1 is a conventional BJT based thermal sensor 100. Thermal sensor 100 includes a first PNP BJT Q1 with base and collector terminals connected to ground (Vss), and emitter terminal connected to a first current source Ic (which is coupled to power supply Vdd). Thermal sensor 100 further includes a second PNP BJT Q2 with base and collector terminals connected to ground (Vss), and emitter terminal connected to a second current source to provide current which is multiple of current Ic i.e., Ic×m, where 'm' is a multiple. The emitters of both Q1 and Q2 have voltages $V_{BE1}$ and $V_{BE2}$, respectively, which are provided to the ADC.

A conventional approach for a temperature measurement uses a voltage which increases linearly with temperature. This so-called PTAT (proportional-to-absolute-temperature) voltage is typically generated from the difference of two base-emitter voltages (i.e., $\Delta V_{BE}$) of PNP BJTs Q1 and Q2, which are biased with different current densities (e.g. ratio 1:m, where 'm' is an integer or fraction). An actual temperature value can be extracted by comparing the PTAT voltage (="ΔVbe") to a temperature independent reference (e.g., a bandgap). In practice, this is achieved by measuring the PTAT voltage (or a multiple of it) directly with an ADC, which in turn includes (or is controlled by) such reference. These circuits may achieve high precision after trimming, but the solution is very complex. Multi-placement is therefore costly.

Multiple hot-spot sensing using conventional thermal sensors can be performed in deep-submicron technologies and may achieve a significantly smaller size e.g., by using remote diodes away from the core thermal sensor. However, the absence of error compensation results is reduced accuracy, with still average power consumption. Some alternative (non-BJT) concepts yield more "digital-alike" circuits, e.g., by using frequency of ring oscillators as thermal reference. But the assumed advantage towards technology scaling manifests actually as a handicap, because the characteristics of MOS (metal-oxide semiconductor) devices vary strongly with process. Poor linearity and spread is discouraging for using such concepts in volume production.

Calibrating a thermal sensor is also a challenge. Calibrating thermal sensor 100 requires a one-point or two-point calibration process, with precise control of die temperature during test. It is difficult to establish a precise temperature on a die for trimming a thermal sensor during test. Current solutions require large effort for calibration control, with yet impaired accuracy, due to temperature uncertainty.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

The embodiments describe an apparatus and method to determine unknown parameters by adding one or more known signal levels (e.g., voltages or currents) into the signal processing chain of a sensor. The embodiments describe an apparatus and method to calibrate a thermal sensor and to measure temperature of silicon die by simple means, but with high accuracy. In one embodiment, the apparatus provides a digital interface and with low silicon area, trimming effort, or power consumption. In one embodiment, the apparatus (e.g., a thermal sensor) generates a PTAT (proportional-to-absolute temperature) current and a CTAT (complementary-to-absolute temperature) current, and uses their difference as a measure for actual temperature. In one embodiment, the thermal sensor comprises a nonlinear feedback loop which provides inherently the function of a current comparator, and a digital output. In the embodiments, compatibility to dual-well process is achieved by generating the PTAT signal through MOS devices operated in weak inversion, and the CTAT signal through a bipolar junction (i.e., diode).

Figure 1:
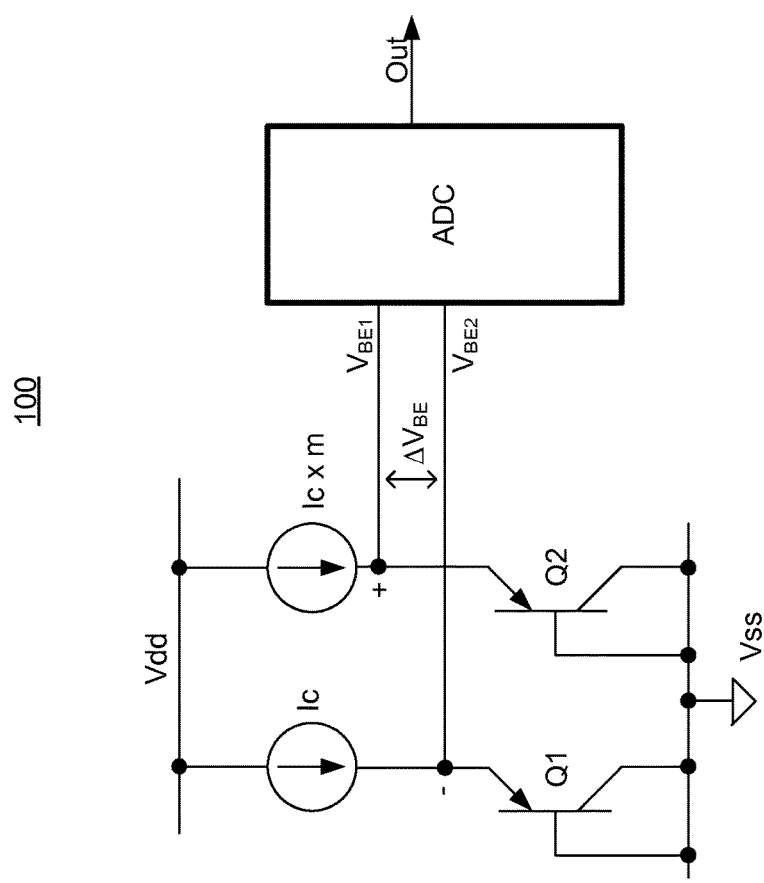
FIG. 1 illustrates a conventional BJT based thermal sensor.

In one embodiment, a successive approximation algorithm (SAR) type analog-to-digital converter (ADC) is realized by sequentially adjusting the temperature threshold, as a function of the digital output. The thermal sensor of the embodiments is less sensitive to process variations and especially MOS mismatch compared to traditional thermal sensors (e.g., FIG. 1). The embodiments may also achieve high linearity (or precision) without costly techniques for error compensation.

The embodiments for calibrating the thermal sensor provide a well defined reference voltage or current, in order to determine the sensor misalignment. In one embodiment, trimming of the senor is performed by injecting an additional known current at node B of FIG. 2A, through a switched resistor coupled to a reference. In one embodiment, the reference can be the supply voltage at the time of calibration.

There are many technical effects of the embodiments. Some non-limiting technical effects include calibrating a thermal sensor without knowledge of actual die temperature. Such a calibrating apparatus and method greatly reduces effort and cost in volume production. The calibrating apparatus and method of the embodiments also improves achievable accuracy and tester time. Since supply can be used as trimming reference, no additional signal, analog interface or other hardware effort may be required. In contrast to known solutions, calibration using the embodiments can be done in different environments, including package test, on board level or even repeatedly during live application. The thermal sensor of the embodiments provides lower complexity of a thermal sensor design compared to traditional thermal sensors i.e., smaller silicon area is used by the embodiments.

The thermal sensor of the embodiments may also exhibit higher accuracy and linearity compared to traditional thermal sensors because the thermal sensor of the embodiments is inherently insensitive to MOSFET mismatch. The thermal sensor of the embodiments may also exhibit higher power supply rejection compared to traditional thermal sensors. In contrast to traditional thermal sensor circuits, the PTAT signal, reference, and analog-to-digital conversion is generated within one feedback loop which makes the thermal sensor of the embodiments insensitive to external distortion. The sensor of the embodiments may allow low voltage operation e.g., power supply voltages of less then 1.0V. The thermal sensor of the embodiments provides higher dynamic range compared to traditional thermal sensors, and so allows for higher resolution and precision. The thermal sensor of the embodiments is also compatible with future technology scaling and FinFet process.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 2A:
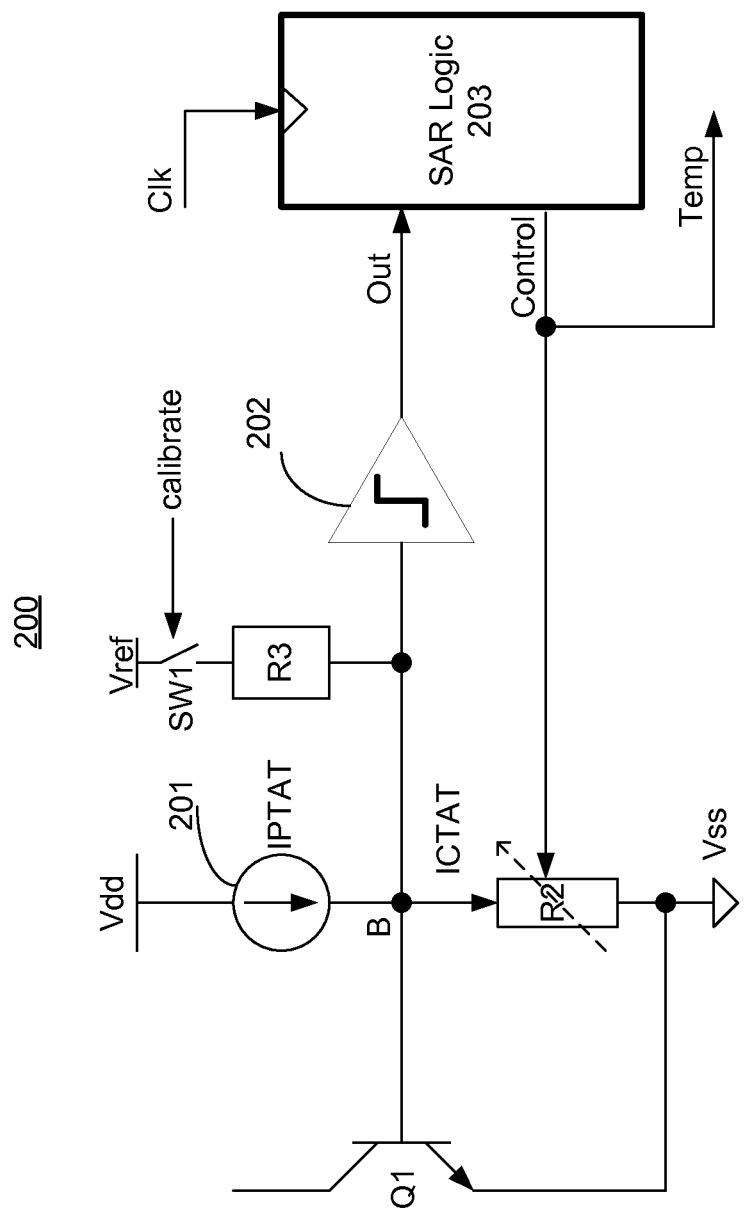
FIG. 2A illustrates a high level circuit architecture of a sensor with SAR (successive approximation algorithm) type ADC, and resistive digital-to-analog converter (DAC) with calibration apparatus, according to one embodiment of the disclosure.

FIG. 2A illustrates a high level circuit architecture 200 of a thermal sensor with SAR type ADC, resistive digital-to-analog converter (DAC), and calibration apparatus, according to one embodiment. In one embodiment, architecture 200 comprises a first current source 201, a second current source realized as a DAC based resistor R2, resistor R3, switch SW1 coupled to resistor R3, current comparator 202, SAR type ADC logic 203, and transistor Q1.

In one embodiment, first current source 201 is coupled to supply Vdd and node B. In one embodiment, resistor R2 is coupled to node B and ground (i.e., Vss). In one embodiment, resistor R3 is coupled in series with a switch SW1. In one embodiment, resistor R3 matches resistor R2 and resistor R1 (in FIG. 3). Here, the term "match" generally refers to ratio of resistor values that stays constant over manufacturing. In one embodiment, switch SW1 couples resistor R3 to a reference supply Vref. In one embodiment, Vref is a power supply (e.g., Vdd). In one embodiment, switch SW1 is controllable by a calibrate signal. In one embodiment, calibrate signal may be generated by any logic. For example, calibrate signal may be controlled by software or hardware or both.

In one embodiment, switch SW1 is implemented as a p-type device. In such an embodiment, the calibrate signal is received at a gate terminal of the p-type device. In other embodiments other types of devices or combinations may be used to implement switch SW1. In one embodiment, one end of resistor R3 is coupled to switch SW1 and another end of resistor R3 is coupled to node B. In one embodiment, the positions of switch SW1 and resistor R3 may be switched. For example, switch SW1 is coupled to node B and resistor R3, while resistor is also coupled to reference supply Vref.

In one embodiment, the base terminal of Q1 is coupled to node B, the emitter terminal of Q1 is coupled to Vss, and the collector terminal is coupled to another current source (not shown). In one embodiment, current comparator 202 has an input coupled to node B and a one-bit output "Out" which is received by SAR type ADC logic 203. In one embodiment, SAR type ADC logic 203 generates a Control signal (e.g., n-bit signal where 'n' is an integer greater than one) to control resistance of resistor R2. In one embodiment, the Control signal also indicates the temperature "Temp."

The operating principle of architecture 200 is based on a current-mode technique which avoids errors introduced by device mismatch, according to one embodiment. The current-mode technique of architecture 200 is in contrast to traditional thermal sensor solutions, which mostly use voltages, either by direct measurement or through conversion to frequency. In one embodiment, temperature sensing is performed by subtracting two currents at node B with opposite temperature coefficients—a precise PTAT current (IPTAT) provided by first current source 201 having positive temperature coefficient and a CTAT current (ICTAT) which is generated by resistor R2 across a $V_{BE}$ voltage of bipolar NPN transistor Q1. Here, $V_{BE}$ voltage of bipolar NPN transistor Q1 has a negative temperature coefficient.

In one embodiment, at a certain threshold temperature, which can be adjusted by adjusting resistance of resistor R2, the current-difference equals zero. In one embodiment, current comparator 202 transforms the analog signal (i.e., the current difference signal) into a 1-bit output "Out." In one embodiment, this result can be further processed with SAR, by means of controlling resistance of resistor R2 implemented as resistive DAC. In one embodiment, after 'n' steps, the resulting SAR output corresponds to the temperature value in digital format.

While architecture 200 illustrates a current source 201 coupled to Vdd and node B, in one embodiment, architecture 200 can be modified so that current source 201 is coupled to Vss and node B while resistor R2 is coupled to node B and Vdd. In such an embodiment, Q1 is replaced with a PNP BJT transistor with its emitter terminal coupled to Vdd and its collector terminal coupled to a current source which is further coupled to ground.

In one embodiment, for calibrating sensor 200, a PTAT current and a CTAT current are subtracted from each other, while the CTAT current is adjusted by resistor R2 and a suitable scan algorithm (e.g. successive approximation), in order to make both currents equal (i.e., "zero balancing"). The resulting binary word (i.e., Control signal), which controls the resistive DAC resistor R2, represents the measured temperature, according to following formula:

$$Iptat - Ictat = \frac{1}{R1} \cdot \frac{kT}{e} \ln(N) - \frac{Vbe}{R2} = 0; \Rightarrow T[° K] \quad (1)$$

$$= \frac{Vgo}{\frac{R2}{R1} \cdot \frac{k \cdot \ln(N)}{e} - tc}$$

where most parameters are physical constants. For example, Vgo is the silicon bandgap (which is approximately 1.25V, i.e., Vbe extrapolated to 0° Kelvin), 'k' is Boltzmann constant, and 'e' is electron charge. Here, resistor R2 has a resistance R2 which is a function of the binary word: R2=f(b), "tc" is the (negative) temperature coefficient of the bipolar junction voltage Vbe, and this value varies in production.

The basic principal of the calibration process is that if an error source in the thermal sensor is known, then it can be calibrated without knowing the temperature. For thermal sensor 200, the dominant source of error may come from the CTAT part (i.e., CTAT current) which varies with manufacturing of diode or transistor Q1. CTAT current is associated with $V_{BE}$ which depends on temperature. In one embodiment, CTAT current is compared with a known current to determine the unknown parameter.

For such type of current-mode sensors as sensor 200, which have their accuracy impacted by mainly one parameter (=tc), the trimming is a two-step procedure, according to one embodiment. In one embodiment, the first of the two-step procedure is to open switch SW1, and the binary value (i.e., b1) at unknown temperature is determined (e.g. through SAR algorithm). Here, the binary value corresponds to the Control signal. In one embodiment, the second of the two-step procedure is to add additional current to node B, at same temperature, by coupling resistor R3 to reference voltage Vref (i.e., SW1=closed).

By closing switch SW1 and adding the additional current through resistor R3 to node B, the operating point or circuit signal levels change in an accurately-defined manner and a second binary value (i.e., b2) can be determined. Here, the second binary value is also the Control signal. In one embodiment, from the first and second binary values (i.e., b1, b2) the unknown parameter "tc" is calculated and used for further temperature measurements, according to formula (1). In one embodiment, since "tc" may differ for each sensor and silicon die, a representative value is stored on-chip by embedded memories or fuses.

In one embodiment, trimming is further simplified if resistor R2 is realized by a serial DAC. In such an embodiment, $R2=R2_0 - b*Ru$, where "Ru" equals the unit resistance (i.e., 1 LSB), and where "$R2_0$" is the base resistance. In one embodiment, calibration can be achieved by storing a binary offset value, which represents deviation of individual "tc" from nominal value. The correlation can be derived mathematically from formula (1).

For example, for each calibration step, resistor R2 adopts a different resistance value "$R2_x$" after the analog to digital conversion (i.e., SAR algorithm), where 'x' is an integer, and where "$R2_0$" is the base resistance. Here, Vbe is calculated from Vgo+T*tc (neglecting curvature). In one embodiment, for the case when SW1 is open (i.e., resistor R3 is decoupled from Vref):

$$\frac{1}{R1} \cdot \frac{kT}{e} \ln(N) = \frac{Vgo + T \cdot tc}{R21} \rightarrow \text{equivalent to} \quad (1)$$

In one embodiment, for the case when SW1 is closed (i.e., resistor R3 is decoupled from Vref):

$$\frac{1}{R1} \cdot \frac{kT}{e} \ln(N) + \frac{Vref - (Vgo + T \cdot tc)}{R3} = \frac{Vgo + T \cdot tc}{R22} \quad (2)$$

Having two equations with two unknown variables (i.e., T, "tc"), "tc" can be determined as:

$$tc = \frac{R3}{R1} \cdot \frac{k \cdot \ln(N)}{\alpha \cdot e} \cdot \left[1 - \frac{R22}{R12} - \frac{R22}{R3} \cdot (1-\alpha)\right], \text{ with } \alpha = \frac{Vref}{Vgo}$$

In a more general view, which applies also to other concepts of temperature sensors (e.g., "voltage-mode"), in one embodiment, the trimming technique can be described by means of bare functions. For example, with 'T' being the unknown parameter (e.g., temperature) during test, and 'b' being the binary sensor output (e.g., Control signal), the procedure yields the following over the two steps—first step when SW1 is open and second step when SW1 is closed. In Step 1: Sensor operates normally without reference signal. For example, during normal operation of the thermal sensor, 'b1' is a function of 'T' and "tc" i.e., b1=f(T, tc), and in Step 2: the sensor operates with the added reference signal. For example, with the added reference signal Vref, "b2" is a function of 'T,' "tc," "Vref," and R3 i.e., b2=f(T, tc, Vref, R3). In this embodiment, since Vref, "b1," "R3" and "b2" are known, the process dependent parameter "tc" can be exactly derived.

The embodiments are not limited to one unknown parameter. The calibration process of the embodiments can be used to calculate two or more unknown parameters, if the two or more parameters can be distinguished and have a predictable temperature characteristic. In such an embodiment, mathematical solution may be achieved by respectively adding more steps, with modified Vref value. In one embodiment, Vref is coupled to Vdd. In such an embodiment, no additional pin is needed and calibration of sensor 200 can be performed without extra effort during chip testing.

Figure 2B:
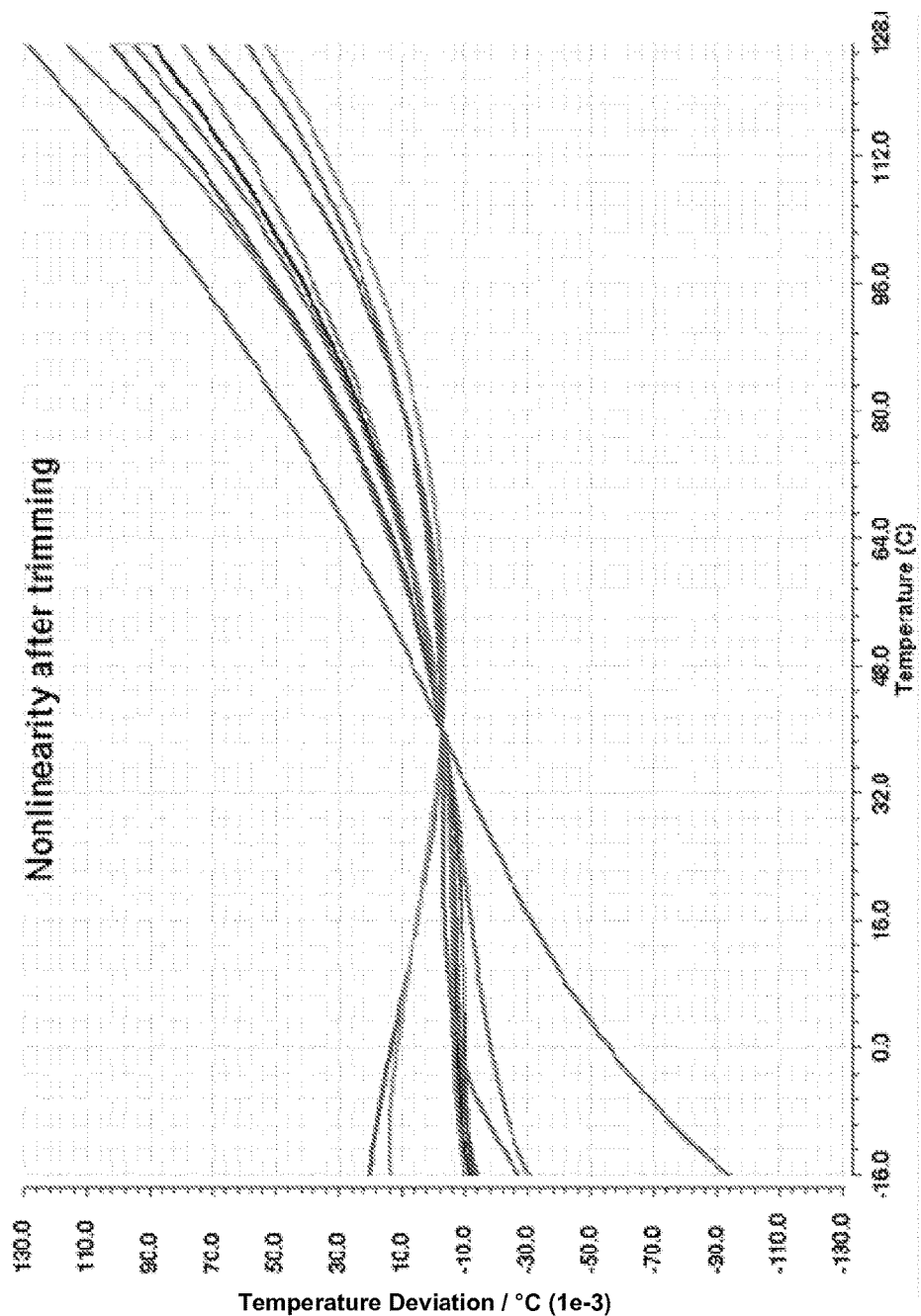
FIG. 2B illustrates a plot showing temperature deviation over temperature for the sensor of FIG. 2A, according to one embodiment of the disclosure.

FIG. 2B illustrates a plot 220 showing temperature deviation over temperature for the sensor of FIG. 2A, according to one embodiment. Here, x-axis is temperature and y-axis is temperature deviation. Plot 220 shows results after performing trimming procedure of the embodiments on current-mode senor 200. In this example, residual temperature error over the full measurement range is calculated for different process corners. Plot 220 shows that the embodiment of calibration results in high precision of just approx. +/−0.15° C. error. Without using the embodiment of calibration and trimming, the temperature deviation would be about +/−4° C. error under same conditions.

Figure 2C:
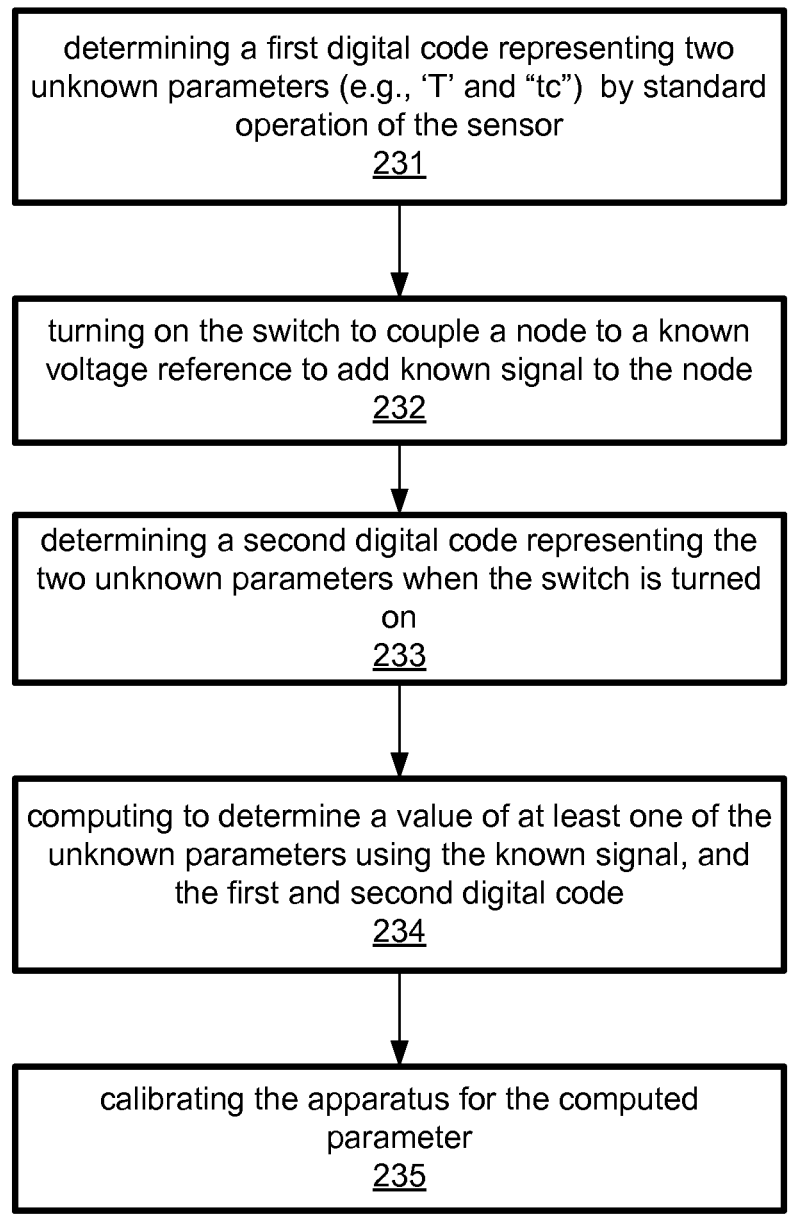
FIG. 2C illustrates flow-chart for calibrating temperature of the sensor of FIG. 2A, according to one embodiment of the disclosure.

FIG. 2C illustrates flow-chart 230 for calibrating temperature of the sensor of FIG. 2A, according to one embodiment. Although the blocks in the flowcharts with reference to FIG. 2C are shown in a particular order, the order of the actions can be modified. Thus, the illustrated embodiments can be performed in a different order, and some actions/blocks may be performed in parallel. Some of the blocks and/or operations listed in FIG. 2C are optional in accordance with certain embodiments. The numbering of the blocks presented is for the sake of clarity and is not intended to prescribe an order of operations in which the various blocks must occur. Additionally, operations from the various flows may be utilized in a variety of combinations. It is pointed out that those elements of FIG. 2C having the same reference numbers (or names) as the elements of any other figure can operate or function in any manner similar to that described, but are not limited to such.

At block 231, a first digital code, representing an unknown parameter(s), is determined by standard operation of the sensor. In this example, the first digital code is "b1" which represents two unknown parameters—a temperature and temperature coefficient "tc." Continuing with this example, the first digital code is determined by turning off switch SW1. At block 232, known signal (e.g., current or voltage) is added to node B by turning on switch SW1 to couple node B to a known voltage reference Vref. The flowchart is explained with reference to adding a known current. However, the embodiments are not limited to adding known current. Other known signals e.g., a known voltage, can be added. In one embodiment, Vref is coupled to Vdd. At block 233, a second digital code "b2" is determined representing the two unknown parameters when switch SW1 is turned on. At block 234, value of at least one of the unknown parameter "tc" is computed using the known voltage Vref, and the first and second digital codes "b1" and "b2." At block 235, sensor 200 is calibrated using the computed parameter "tc."

Figure 3:
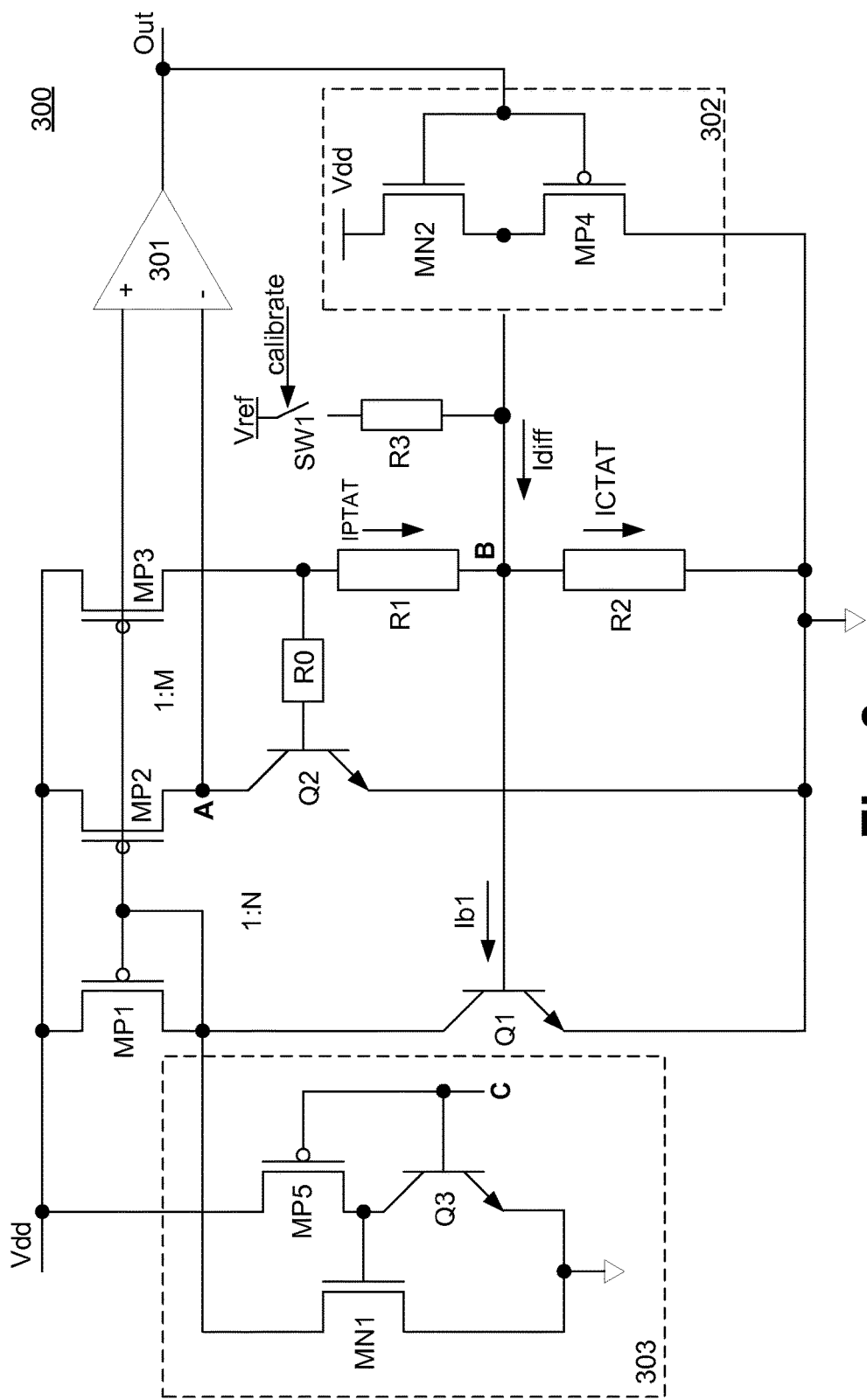
FIG. 3 illustrates a thermal sensor with PTAT generation loop with calibration apparatus, according to one embodiment of the disclosure.

FIG. 3 is a thermal sensor 300 with PTAT generation loop, according to one embodiment. It is pointed out that those elements of FIG. 3 having the same reference numbers (or names) as the elements of any other figure can operate or function in any manner similar to that described, but are not limited to such.

In one embodiment, thermal sensor 300 comprises first resistor R1, second resistor R2, third resistor R3, and fourth resistor R0, NPN BJT transistors Q1 and Q2, comparator 301, buffer 302, startup circuit 303, p-type transistors MP1, MP2, and MP3, and switch SW1 coupled to R3. In one embodiment, fourth resistor R0 is optional.

In one embodiment, first resistor R1 is coupled to node B and a current source. In this embodiment, the current source is realized by MP3 with its drain terminal coupled to first resistor R1 and its source terminal coupled to Vdd, and its gate terminal biased by some bias voltage. In one embodiment, second resistor R2 is coupled to node B and ground (same as shown in FIG. 2). In one embodiment, transistor Q1 is coupled as shown in FIG. 2, where the collector terminal is coupled to the drain terminal of MP1.

In one embodiment, resistor R3 matches resistor R2. In one embodiment, switch SW1 couples resistor R3 to a reference supply Vref. In one embodiment, Vref is a power supply (e.g., Vdd). In one embodiment, switch SW1 is controllable by a calibrate signal. In one embodiment, switch SW1 is implemented as a p-type device. In such an embodiment, the calibrate signal is received at a gate terminal of the p-type device. In other embodiments other types of devices or combinations may be used to implement switch SW1. In one embodiment, one end of resistor R3 is coupled to switch SW1 and another end of resistor R3 is coupled to node B. In one embodiment, the positions of switch SW1 and resistor R3 may be switched. For example, switch SW1 is coupled to node B and resistor R3, while resistor is also coupled to reference supply Vref.

In one embodiment, MP1 and MP2 form a current mirror, where MP1 is diode connected (i.e., its gate terminal coupled to its drain terminal). In such an embodiment, MP1 generates a reference current which is mirrored on MP2 which is biased by the same voltage as MP1 because their respective gate terminals are coupled together. In one embodiment, MP2 is sized 'N' times larger than MP1 to up-scale current through MP2 by 'N' times compared to current through MP1. In one embodiment, MP3 is also biased by the same gate voltage as gate voltage of MP1. In other embodiments, MP3 is a standalone current source decoupled from current mirror formed of MP1 and MP2. In one embodiment, current through MP3 may be same or different than the currents through MP1 and/or MP2.

In one embodiment, a second PNP transistor Q2 is coupled to MP2. In such an embodiment, the collector terminal (node A) of Q2 is coupled to drain terminal of MP2, the emitter terminal of Q2 is coupled to ground, and the base terminal of Q2 is coupled to first resistor R1 directly or via fourth resistor R0. In one embodiment, transistors Q1 and Q2 form a pseudo-differential pair with intentional asymmetry defined by a size (or current-) ratio of 1:N. In one embodiment, comparator 301 is coupled to drain terminal of MP2 (i.e., node A). In one embodiment, output "Out" of comparator 301 is coupled to input of buffer 302.

In one embodiment, buffer 302 comprises devices that coupled together provide a non-linear characteristic. In one embodiment, buffer 302 comprises an n-type transistor MN2 coupled in series to a p-type transistor MP4. In this embodiment, drain terminal of MN2 is coupled to Vdd and source terminal of MN2 is coupled to node B. In one embodiment, source terminal of MP4 is coupled to node B and drain terminal of MP4 is coupled to ground.

In one embodiment, start-up circuit 303 comprises a p-type transistor MP5 coupled in series to an NPN transistor Q3 as shown. In one embodiment, start-up circuit 303 comprises an n-type transistor MN1 with its gate terminal coupled to common terminal of MP5 and Q3, its source terminal coupled to ground, and its drain terminal coupled to drain terminal of MP1. In one embodiment, gate terminal of MP5 and base terminal of Q3 are biased by a voltage on node C.

In one embodiment, the pseudo-differential pair Q1 and Q2, with intentional asymmetry defined by a size (or current-) ratio of 1:N, cause PTAT current (IPTAT) to be generated such that the base-emitter voltage ($V_{BE}$) difference of Q1 and Q2 appears across resistor R1 within a (positive) feedback loop. In such an embodiment, the accuracy of IPTAT is not degraded by variations of size or gain in MP3, or even offset of amplifier/comparator 301 because IPTAT may not depend on matching of MP3 (e.g., W, L or Vth) versus MP1/MP2.

In one embodiment, resistor R2 is coupled in series to resistor R1 so that reference current (ICTAT) is provided for comparison function, without the need for additional current mirrors. In this embodiment, ICTAT is well defined by base-emitter voltage $V_{BE}$ of Q1, and the negative temperature coefficient (TC) allows larger sensitivity than a conventional zero TC reference. Assuming Idiff=0 and neglecting base current Ib1 of Q1, there is one certain operating condition (respectively temperature), where IPTAT matches ICTAT to fulfill Kirchhoff's current law.

In one embodiment, architecture 300 is stabilized by providing a second (negative) feedback which delivers current Idiff to the summing node B. In this embodiment, the second feedback includes amplifier 301 with buffer 302. In one embodiment, buffer 302 is a class-AB driver. In one embodiment, amplifier 301 is a differential pair (not shown). In other embodiments, other implementations for amplifier 301 may be used. In one embodiment, amplifier 301 performs the function of decoupling node A from node B. In this embodiment, the differential operation of amplifier 301 has benefits for symmetry and PSRR (power supply rejection ratio), because collectors of NPN transistors Q1 and Q2 are now forced to same potential. In one embodiment, amplifier 301 has a current source which is a replica of MP3. In such an embodiment, architecture 300 is self-biased.

Base current Ib1 of NPN transistor Q1 may create an error (offset) voltage across R1, which also varies with process. In one embodiment, the offset is corrected by choosing IPTAT to be much larger than the current through NPN transistor Q1. In such an embodiment, Ib1 is negligible. In another embodiment, resistor R0 is added in series to NPN transistor Q2, which effectively compensates the error, even for low β.

In one embodiment, the process of calibrating sensor 300 is the same as the process of calibration discussed with reference to FIGS. 2A-C.

Figure 4:
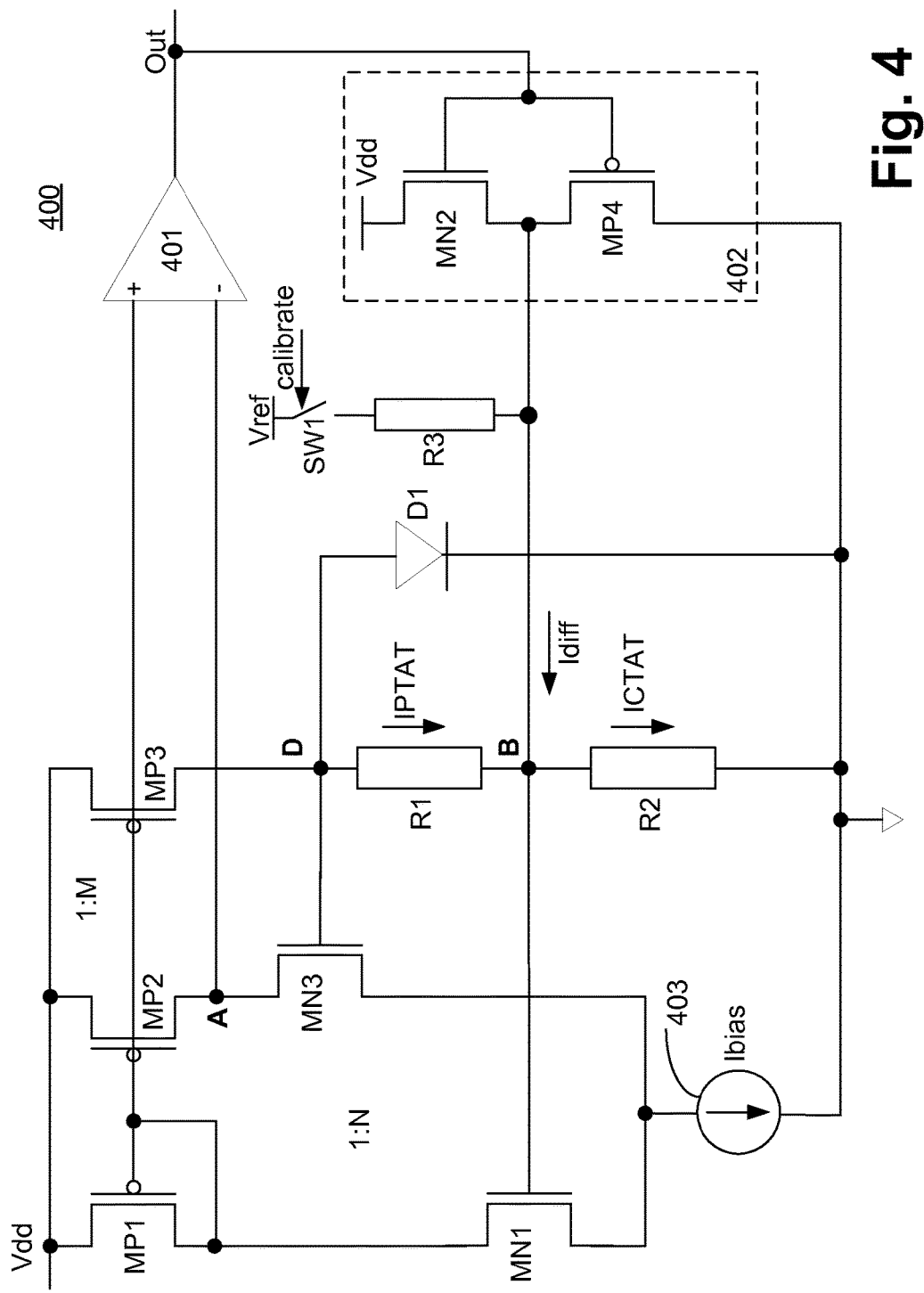
FIG. 4 illustrates a MOS (metal oxide semiconductor) based current-mode thermal sensor with calibration apparatus, according to one embodiment of the disclosure.

FIG. 4 is a MOS based current-mode thermal sensor 400, according to one embodiment of the disclosure. It is pointed out that those elements of FIG. 4 having the same reference numbers (or names) as the elements of any other figure can operate or function in any manner similar to that described, but are not limited to such. So as not to obscure the embodiments, discussion of same elements discussed previously with reference to other embodiments are not repeated again.

In one embodiment, MOS based current-mode thermal sensor 400 comprises p-type transistors MP1, MP2, and MP3 which are similar to the p-type transistors MP1, MP2, and MP3 of FIG. 3. As discussed with reference to FIG. 3, in one embodiment, MP3 may be a standalone current source decoupled from current mirror formed by transistors MP1 and MP2. Referring back to FIG. 4, in one embodiment, amplifier 401 is same as amplifier 301. In one embodiment, amplifier 401 can be a general amplifier (e.g., multi-stage amplifier). In one embodiment, amplifier 401 can also be a single stage amplifier with single input from node A. In one embodiment, output signal "Out" of amplifier 401 may be provided to a digital input for further processing directly or via a comparator, a logic gate, or a Schmitt trigger. In one embodiment, resistors R1 and R2 of MOS based current-mode thermal sensor 400 are same as resistors R1 and R2 of FIG. 3, and coupled together in series with MP3.

In one embodiment, buffer 402 is same as buffer 302. In one embodiment, buffer 402 introduces a non-linearity into the transfer curve of the voltage provided to the input of buffer 402 and the current provided at its output to the summing node B. The non-linearity has the effect that the ratio between a given output current swing provided by buffer 402 and the input voltage swing to provide the output current swing is not linear over the input voltage range of buffer 402.

In one embodiment, buffer 402 is configured such that this ratio has its minimum at the point where the polarity of the current changes polarity i.e., around the zero point of the output current, larger input voltage swings are needed to produce a given output current swing than from higher output current values. In one embodiment, there may be a voltage threshold in the control of buffer 402. In such an embodiment, around the zero point of the output current, the input voltage of buffer 402 corresponding to the output voltage "Out" of amplifier 401 has to overcome this voltage threshold before it can cause a change in the output current. In this embodiment, the input voltage of buffer 402 behaves likes a digital signal since all voltages below the threshold voltage no longer occur since they have no effect on the output current and only higher voltage value about the threshold voltage occur.

In one embodiment, MOS based current-mode thermal sensor 400 comprises an asymmetric differential amplifier using MOS transistors MN1 and MN3 together with current mirror loads MP1 and MP2. In one embodiment, drain terminal of MN1 is coupled to drain terminal of MP1 and source terminal of MN1 is coupled to current source 403. In one embodiment, drain terminal of MN3 is coupled to drain terminal of MP2 and source terminal of MN3 is coupled to current source 403. In one embodiment, current through current source 403 is Ibias. In one embodiment, gate terminal of MN3 is coupled to node D. In one embodiment, gate terminal of MN1 is coupled to node B. In one embodiment, a diode D1 is coupled in parallel to resistors R1 and R2 i.e., diode D1 is in parallel to node D. For example, anode of diode D1 is coupled to node D and cathode of diode D1 is coupled to ground (Vss).

In this embodiment, IPTAT is not generated by $V_{BE}$ of NPN transistor Q2, but is generated by MOS transistor MN3 operating in weak inversion mode. In one embodiment, MN1 also operates in weak inversion mode. In one embodiment, MN1 and MN3 operate in weak inversion mode by making MN1 and MN3 large devices (i.e., their W/Ls are substantially larger than W/Ls of other transistors of sensor 400). In one embodiment, MN1 and MN3 are operated in weak inversion mode by keeping current density of these devices low enough so that exponential current law, instead of square current law, is valid for these devices.

In one embodiment, the core function is generated by MOS transistors MN1 and MN3, which operate in weak-inversion and at different current densities (ratio 1:N). In one embodiment, weak-inversion in devices MN1 and MN3 is achieved by specific device ratio, or by forcing a different current ratio, or both. In one embodiment, MP3 provides a current to diode D1 and also resistor R1 such that the voltage drop over resistor R1 keeps the differential pair in equilibrium. Compared to the embodiment of FIG. 3, there is no positive feedback loop (through MP3) in the embodiment of FIG. 4 i.e., all feedback happens through buffer 402 only, which stabilizes IPTAT.

In one embodiment, resistor R1 is coupled between the gates of 'N' ratio-ed transistors MN1 and MN3, the corresponding delta-Vgate-voltage is PTAT and results in a strictly temperature-proportional current, IPTAT, which can be expressed as:

$$IPTAT = \frac{Vg1 - Vg3}{R1} = \eta \cdot Vt \cdot \frac{\ln(N)}{R1} \quad (1)$$

where Vt=thermal voltage (=k*T/q), η=sub threshold slope factor, and Vg1 and Vg3 are the gate voltages of MN1 and MN3, respectively. This method of PTAT generation is useful for FinFet technologies, where 'η' equals to 1. Normally factor 'η' varies slightly with process, but it is virtually constant (i.e. equal to 1) for FinFets, which show no "bulk-effect." In one embodiment, higher overall precision is achieved when FinFets are used in weak inversion to generate IPTAT.

In one embodiment, diode D1 which is coupled in parallel to the PTAT branch, effectively clamps node D to a fixed voltage Vg3 with CTAT behaviour. In one embodiment, diode D1 defines a common mode level. In one embodiment, MP3 provides just a bias current to diode D1 and resistor R1. In one embodiment, MP3 is not involved in feedback control. In one embodiment, the value of tail current Ibias, which in one embodiment is a replica of current through MP3 may be created by a simple PTAT current source to get a predictable temperature slope. In one embodiment, Ibias is generated by a self-biased loop. In one embodiment, when Ibias is provided by current source 403, sensor 400 achieves startup and can operate for its normal function. In such an embodiment, a special startup circuit (e.g., 303 of FIG. 3) may not be used.

In one embodiment, diode D1 may be realized by a diode-connected bipolar device (e.g. "substrate-PNP"), a device which produces a voltage drop with negative temperature coefficient, Schottky-contact diode, a discrete diode, a lateral bipolar diode, a diode formed from an MOS transistor, or a BJT based diode. The above list of diodes is not meant to be an exclusive list. Other forms of diode or diode behaving elements can be used for realizing diode D1.

In one embodiment, biasing current for D1 is provided by circuit branch having MP3, resistors R1 and R2, or by other means. In one embodiment, due to the feedback loop, the voltage at node B (Vg1) is also "CTAT," and equals the voltage-drop of a diode with 'N' times smaller current density than diode D1. In one embodiment, since resistor R2 is coupled in parallel to such "virtual diode," it carries a current ICTAT with negative temperature coefficient which can be expressed as:

$$ICTAT = \frac{Vg1}{R2} \quad (2)$$

where Vg1 is the virtual diode D2 voltage which has negative temperature coefficient.

In one embodiment, the "threshold" value of temperature can be adjusted by modifying resistance of resistor R2. In one embodiment, resistance of resistor R2 is modified by digitally controlled switches (e.g., resistor DAC).

Continuing with the above explanation, by adding amplifier 401 and buffer 402 as illustrated in sensor 400, a current Idiff is inserted at node B, according to one embodiment. In one embodiment, current Idiff generated by buffer 402 is used to regulate IPTAT, which also stabilizes Vg1 to have CTAT behaviour. In such an embodiment, negative feedback is added, and a stable operating condition is achieved, with:

$$Idiff = IPTAT - ICTAT = \frac{Vt}{R1} \cdot \eta \cdot \ln(N) - \frac{Vg1}{R2} \quad (3)$$

In this embodiment, Idiff of equation 3 has a much larger (absolute) temperature coefficient than temperature coefficients of traditional thermal sensors, and so more precise evaluation of temperature is achieved by sensor 400. In one embodiment, Idiff takes on both polarities (i.e., positive and negative) and crosses zero when the temperature matches with the predefined threshold (through resistance of resistor R2).

In one embodiment, a strongly non-linear transfer function is provided between nodes A and B, so that the loop gain reduces drastically at Idiff=0. In one embodiment, this is accomplished by specific coupling of NMOS/PMOS devices, driving Idiff in class AB-type. In such an embodiment, the voltage at OUT switches between two distinctive values and therefore outputs the function of a highly sensitive current comparator.

In one embodiment, all relevant functions of sensor 400 are established with little sensitivity to MOSFET matching. In such an embodiment, sensor 400 achieves high precision without extra circuits for error correction, like increased area, chopping or auto-zero techniques. In one embodiment, the most sensitive PTAT signal is regulated through main feedback loop and does not depend on matching of MP3. In one embodiment, overall linearity of sensor 400 is hardly affected by mismatch of current mirror MP1 and MP2 due to the large $g_m$ of MN1 and MN3.

In contrast to traditional thermal sensors, the embodiments process currents instead of voltages for thermal measurement and evaluation. This enables high (e.g., unlimited) dynamic range and avoids limitations with voltage headroom. In one embodiment, MOS based current-mode thermal sensor 400 does not include any open loop control, with subsequent provision for error correction. For example, different tasks of generating a temperature dependent signal, providing a reference and comparison, are all accomplished at once within a feedback loop. The above features account for low sensitivity to mismatch errors, and therefore higher accuracy.

Depending on the comparison result, MOS based current-mode thermal sensor 400 flips between two operating states, therefore comprising a bi-stable behavior. In one embodiment, MOS based current-mode thermal sensor 400 allows analog-to-digital conversion by applying a simple successive approximation algorithm ("SAR"). For example, a single comparator output is provided which compares the temperature signal against a threshold value. This threshold can be adjusted by digital numbers, which inherently represents the main ADC functionality.

In one embodiment, a processor can have multiple sensors like sensor 400 dispersed through out the processor for sensing temperatures at various parts of the processor. In one embodiment, outputs of each sensor can be processed by a power management unit (PCU) to control various features of the processor e.g., power supply level, operating frequency, external thermal control (e.g., fan speed control), etc. In one embodiment, sensor 400 is implemented as an on-die thermal sensor. In other embodiments, sensor 400 is implemented as an off-die thermal sensor.

In one embodiment, the process of calibrating sensor 400 is the same as the process of calibration discussed with reference to FIGS. 2A-C.

Figure 5:
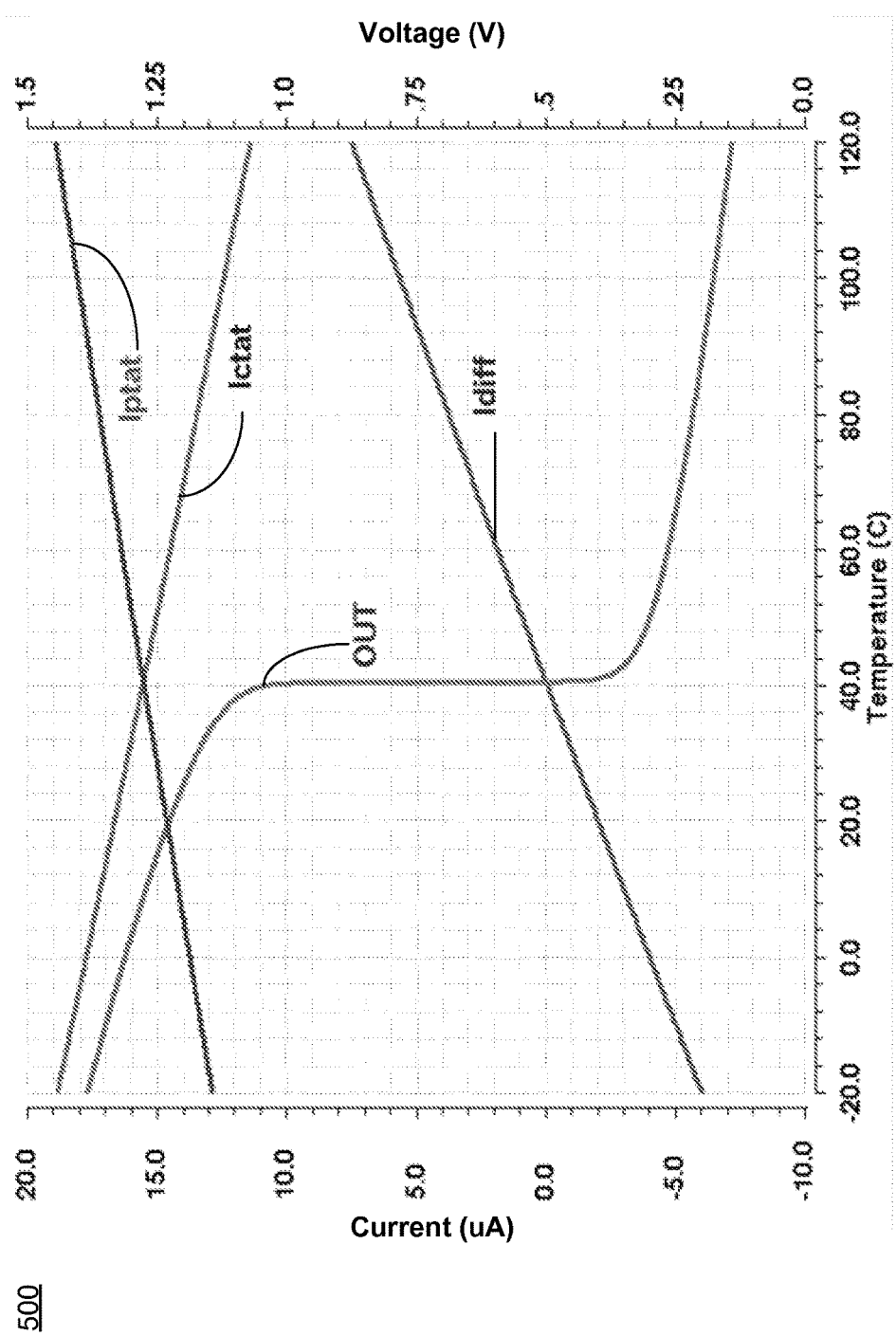
FIG. 5 illustrates a plot showing operation of the MOS based current-mode thermal sensor, according to one embodiment of the disclosure.

FIG. 5 is a plot 500 showing operation of the MOS based current-mode thermal sensor, according to one embodiment of the disclosure. It is pointed out that those elements of FIG. 5 having the same reference numbers (or names) as the elements of any other figure can operate or function in any manner similar to that described, but are not limited to such.

The x-axis is temperature in Celsius (C), the y-axis on the left side is current (µA), and the y-axis on the right side is voltage (V). Plot 500 indicates IPTAT and ICTAT as a function of temperature. In one embodiment, when IPTAT and ICTAT are substantially equal (or identical), Idiff is sensed as zero (or substantially zero). In one embodiment, node "OUT" acts like a digital signal, switching sharply between positive and negative MOS threshold when Idiff changes polarity. In one embodiment, the DAC settings for resistor R2 (which determine the temperature threshold) indicate the sensed temperature. Idiff at zero-crossing point can be expressed as:

$$Idiff = IPTAT - ICTAT = \frac{1}{R1} \cdot \frac{kT}{e} \ln(N) - \frac{Vg1}{R2} = 0; \Rightarrow T = \frac{\frac{Vgo}{\frac{R2}{R1} \cdot \frac{k \cdot \ln(N)}{e}} - tc} \quad (4)$$

where, Vgo is a constant of approximately 1.2V and related to the silicon bandgap extrapolated to 0 K), "tc" is the temperature coefficient of diode D1 and is approximately 2 mV/K.

In one embodiment, if the negative feedback (node A towards node B) has a strong nonlinear transfer characteristic exactly at Idiff=0, then it includes effectively the function of a current comparator. This behavior is accomplished by transistors MP2 and MP3 in the specific configuration, working similar like two anti-parallel diodes.

Figure 6:
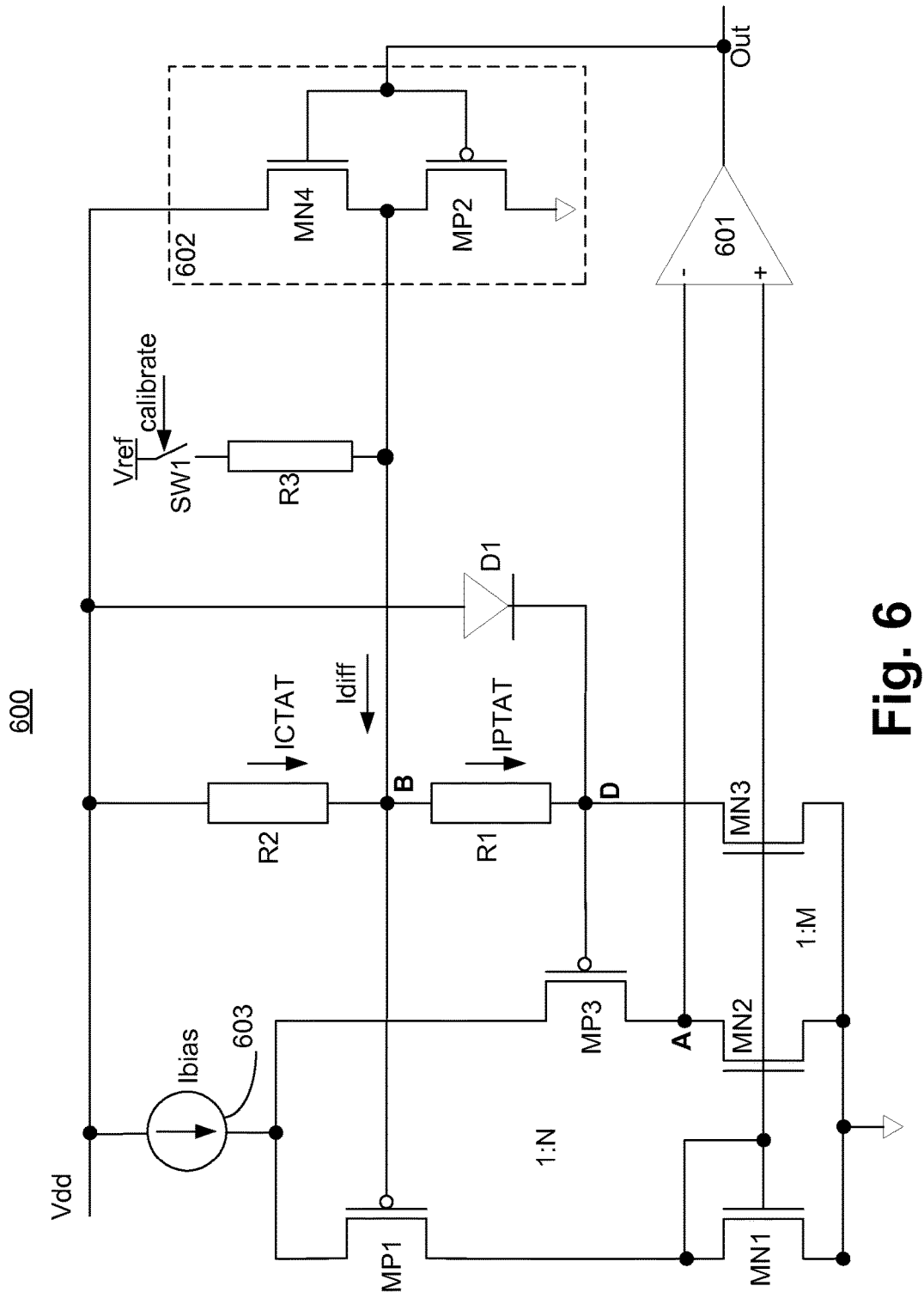
FIG. 6 illustrates a MOS based current-mode thermal sensor with calibration apparatus, according to another embodiment of the disclosure.

FIG. 6 a MOS based current-mode thermal sensor 600, according to another embodiment of the disclosure. It is pointed out that those elements of FIG. 6 having the same reference numbers (or names) as the elements of any other figure can operate or function in any manner similar to that described, but are not limited to such.

The embodiment of MOS based current-mode thermal sensor 600 is similar to the embodiment of MOS based current-mode thermal sensor 400 except that the design is a complementary design using n-type current mirror, p-type differential pair, and n-type current source to generate Ibias. MOS based current-mode thermal sensor 600 is functionally equivalent to MOS based current-mode thermal sensor 400. So as not to obscure the embodiments, functional details of each device/component of sensor 600 are not discussed because they are similar to that of sensor 400.

In one embodiment, current-mode thermal sensor 600 comprises amplifier 601 (functions similar to amplifier 401), buffer 602 (which functions similar to buffer 402), current source 603 to generate Ibias (which functions similar to current source 403), differential p-type transistors MP1 and MP3 (which function similar to differential n-type transistors MN1 and MN3), n-type current mirror loads MN1 and MN2 (which function similar to p-type current mirror loads MP1 and MP2), n-type current source MN3 (which functions similar to p-type current source MP3), resistor R1 (same as resistor R1 of FIG. 4), resistor R2 (which is same as resistor R2 of FIG. 4), diode D1 which is same as diode D1 of FIG. 4, switch SW1 (which is same as switch SW1 of FIGS. 3-4), and resistor R3.

In one embodiment, resistor R3 matches resistor R2. In one embodiment, switch SW1 couples resistor R3 to a reference supply Vref. In one embodiment, Vref is a power supply (e.g., Vdd). In one embodiment, switch SW1 is controllable by a calibrate signal. In one embodiment, switch SW1 is implemented as a p-type device. In such an embodiment, the calibrate signal is received at a gate terminal of the p-type device. In other embodiments other types of devices or combinations may be used to implement switch SW1. In one embodiment, one end of resistor R3 is coupled to switch SW1 and another end of resistor R3 is coupled to node B. In one embodiment, the positions of switch SW1 and resistor R3 may be switched. For example, switch SW1 is coupled to node B and resistor R3, while resistor is also coupled to reference supply Vref.

In this embodiment, anode of diode D1 is coupled to Vdd and cathode of diode D1 is coupled to node D. In this embodiment, resistor R2 is coupled between Vdd and node B and resistor R1 is coupled between nodes B and D. In this embodiment, MN4 of buffer 602 has its drain terminal coupled to Vdd and source terminal coupled to node B. In this embodiment, source terminal of MP2 is coupled to node B while drain terminal of MP2 is coupled to ground. In this embodiment, current source 603 is coupled between Vdd and common node of MP1 and MP3.

In one embodiment, the process of calibrating sensor 600 is the same as the process of calibration discussed with reference to FIGS. 2A-C.

Figure 7:
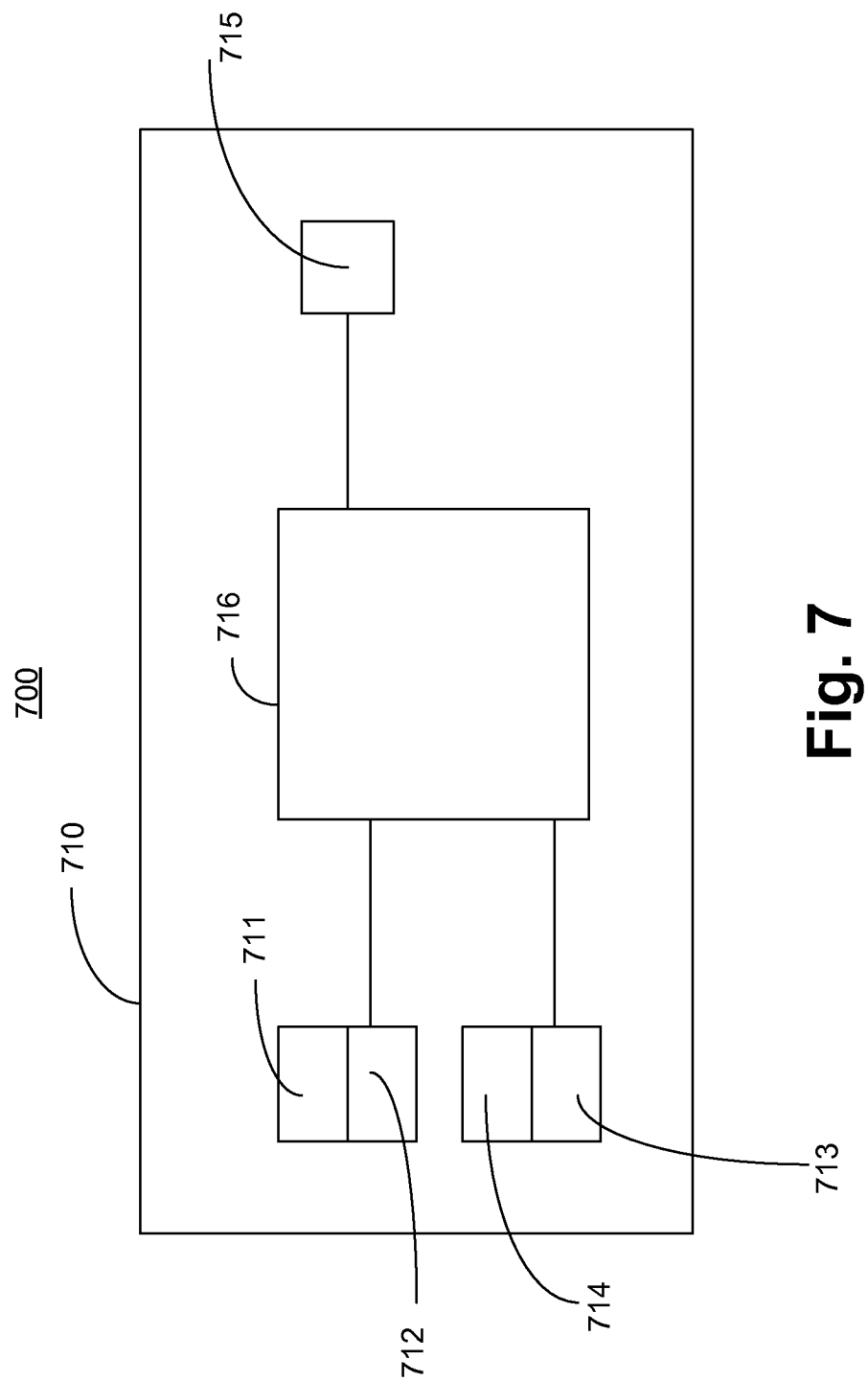
FIG. 7 shows architecture of a system with the thermal sensors and corresponding calibration apparatus for the embodiments.

FIG. 7 shows architecture 700 of a system 710 with the thermal sensors of the embodiments. It is pointed out that those elements of FIG. 7 having the same reference numbers (or names) as the elements of any other figure can operate or function in any manner similar to that described, but are not limited to such.

In one embodiment, system 710 may be a System-on-Chip (SoC) or in general any semiconductor circuit using an indication of temperature. In one embodiment, system 710 may have a system block 716, a first temperature sensor 711 and 712, a second temperature sensor 713 and 714 and a third temperature sensor 715. In one embodiment, system 710 may have only one temperature sensor or any other number of temperature sensors. In one embodiment, system block 716 may be of any type and may be for example a communication circuit and may have a digital section.

In one embodiment, first temperature sensor 711, 712 may have an analog section 711 and a digital section 712. In one embodiment, second temperature sensor 713, 714 may also have an analog section 713 and a digital section 714. In one embodiment, third temperature sensor 715 may have only an analog section 715. In one embodiment, analog sections 711, 713 and 715 of the first, second and third temperature sensors may the circuit arrangement of FIG. 4 and/or FIG. 6. In one embodiment, digital sections 712, 714 of the first and second temperature sensors may have control circuit for adjusting resistance of R2. In one embodiment, for third temperature sensor 715 the control circuit (not shown) may be formed by elements within the system block 716. In one embodiment, these elements may be dedicated digital circuit components or a program for performing the required functions.

In one embodiment, the three temperature sensors 711-715 allow to sense the temperature within the system 710 at three different places. Different temperature sensors may also be used to provide both a temperature reading indicating the absolute temperature and a binary temperature information indicating only whether the temperature exceeds a threshold.

Figure 8:
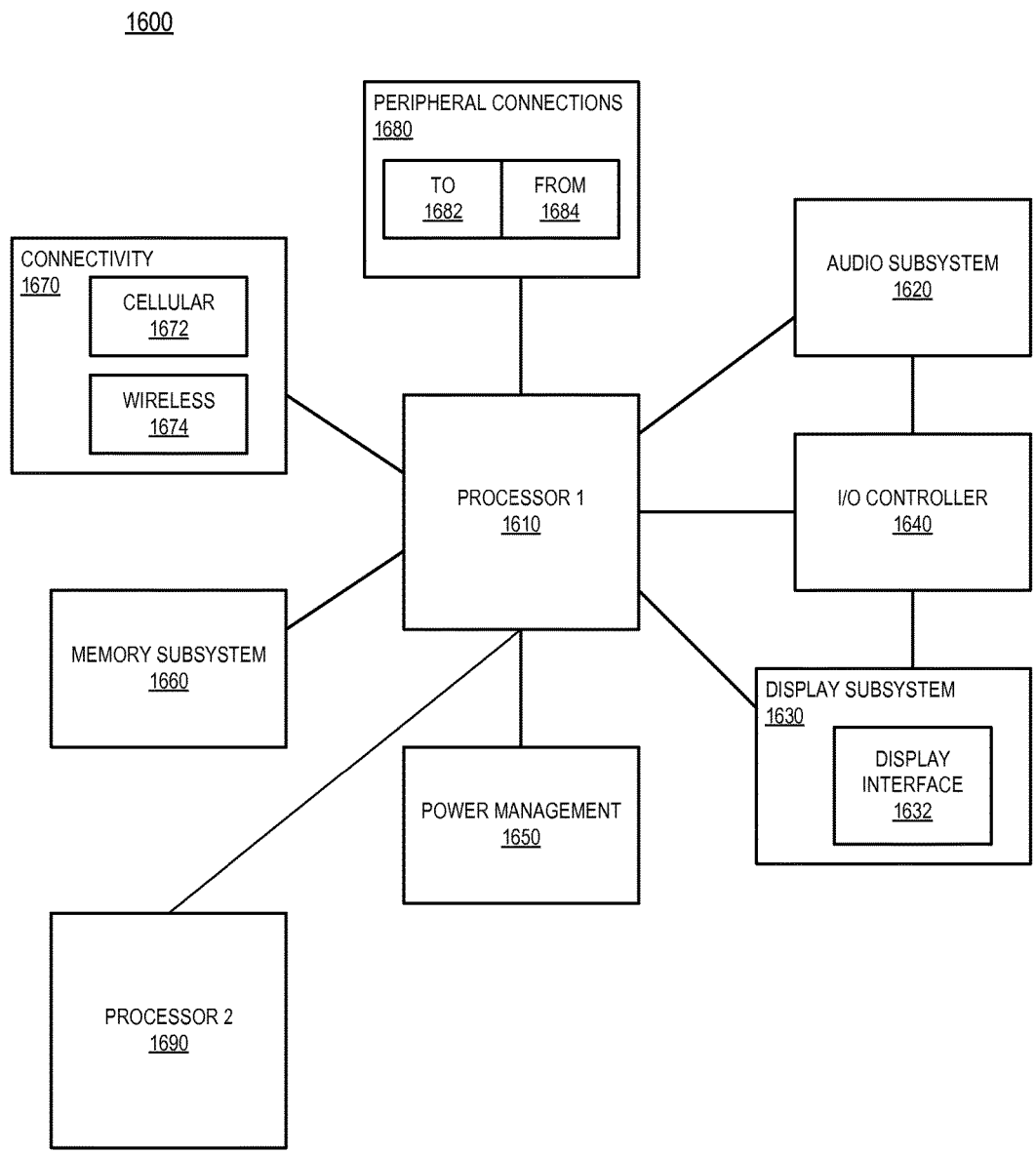
FIG. 8 is a smart device or a computer system or an SoC (System-on-Chip) with apparatus current-mode thermal sensor, according to one embodiment of the disclosure.

FIG. 8 is a smart device or a computer system or an SoC (System-on-Chip) with apparatus of current-mode thermal sensor and apparatus for calibrating the thermal sensor, according to one embodiment of the disclosure. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with apparatus of current-mode thermal sensor and apparatus for calibrating the thermal sensor described with reference to embodiments discussed. Other blocks of the computing device 1600 may also include apparatus of current-mode thermal sensor and apparatus for calibrating the thermal sensor described with reference to embodiments discussed. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a first transistor with a gate terminal coupled to a first node; a second transistor with a gate terminal coupled to a second node; a first resistor coupled to the first and second nodes; a second resistor coupled to the first node and a supply node; a diode coupled to the second node and the supply node; a third resistor coupled to the second node; and a switch coupled to the third resistor and a reference supply. In one embodiment, the reference supply is a power supply. In one embodiment, the switch is operable to be closed or opened for calibrating the apparatus. In one embodiment, the first and second transistors to operate in weak inversion mode.

In one embodiment, the first and second transistors are configured to form a differential pair. In one embodiment, the first and second transistors provide a PTAT signal. In one embodiment, the diode provides a CTAT signal on the first and second nodes. In one embodiment, the supply node is a ground node. In one embodiment, the apparatus comprises a current source coupled to a common node of the first and second transistors.

In one embodiment, the apparatus further comprises a current mirror to provide: a first current through the first transistor, and a second current through the second transistor. In one embodiment, the current mirror to cause the second current to be a multiple of the first current. In one embodiment, the apparatus further comprises: an amplifier including inputs coupled to nodes of the current mirror, and an output; and a buffer including an input coupled to the output of the amplifier, and an output coupled to the first node.

In one embodiment, the buffer comprises devices that coupled together provide a non-linear characteristic. In one embodiment, the apparatus further comprises: a current source to provide a third current through a third transistor, wherein the third transistor is coupled to the second node. In one embodiment, the apparatus further comprises a circuit to adjust resistance of the second resistor. In one embodiment, the circuit comprises a digital-to-analog converter (DAC). In one embodiment, the diode is one of: a device which produces a voltage drop with negative temperature coefficient; Schottky-contact diode; a discrete diode; a lateral bipolar diode; a diode formed from a MOS transistor; or a BJT based diode. In one embodiment, the first and second resistors are coupled together in series.

In another example, a system is provided which comprises: a memory unit; a processor coupled to the memory unit, the processor having a temperature sensor according the apparatus discussed above; and a wireless interface for allowing the processor to communicate with another device. In one embodiment, the system further comprises: a display unit for displaying content processed by the processor.

In another example, a method for calibrating an apparatus is provide. In one embodiment, the method comprises: determining a first digital code representing two unknown parameters by turning off a switch; turning on the switch to couple a node to a known voltage reference to add known current to the node; determining a second digital code representing the two unknown parameters when the switch is turned on; computing to determine a value of at least one of the unknown parameters using the known voltage, and the first and second digital code; and calibrating the apparatus for the computed parameter.

In one embodiment, the at least one of the unknown parameters is temperature coefficient of a diode. In one embodiment, the first digital code is determined at an unknown temperature. In one embodiment, the known current is added at the same unknown temperature, and wherein the known current changes operating point of the apparatus. In one embodiment, the method further comprises storing the calculated value of the unknown parameter is a storage unit. In one embodiment, the method further comprises trimming the apparatus by adjusting components of the apparatus by the storage calculated value.

In one embodiment, the apparatus comprises: a first transistor with a gate terminal coupled to a first node; a second transistor with a gate terminal coupled to a second node; a first resistor coupled to the first and second nodes; a second resistor coupled to the first node and a supply node; a diode coupled to the second node and the supply node; and a third resistor coupled to the second node; and wherein the switch coupled to the third resistor and a reference supply. In one embodiment, the apparatus is according to the apparatus discussed above. In one embodiment, the node is the second node.

In another example, an apparatus is provided which comprises means for performing a method according the method discussed above.

In another example, a method is provide which comprises: determining a first digital code representing 'N' number of unknown parameters; coupling "N−1" number of different reference signals to a processing core by performing "N−1" separate measurement operations; determining another "N−1" digital codes representing the 'N' unknown parameters; computing to determine a value of at least one of the 'N' unknown parameters using the known "N−1" reference signals, and 'N' number of digital codes; and calibrating an apparatus, having the processing core, for the computed value of the at least one of the 'N' unknown parameter, where 'N' is an integer.

In one embodiment, the apparatus is a thermal sensor, and the processing core includes a node of the thermal sensor. In one embodiment, the known reference signal includes at least one or more of: time, voltage, or current. In one embodiment, the 'N' unknown parameters include temperature and temperature coefficient. In another example, an apparatus comprises means for performing a method according to the method discussed above.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
    a first transistor with a gate terminal coupled to a first node and a current source;
    a second transistor with a gate terminal coupled to a second node and ground;
    a first resistor coupled to the first and second nodes;
    a second resistor coupled to the first node and a reference voltage supply;
    a diode coupled to the second node;
    a third resistor coupled to the second node and the voltage reference supply; and
    a switch coupled to the third resistor and the voltage reference supply, and wherein a temperature is sensed by subtracting a first current from the first resistor with a second current from the third resistor at the first node when the switch is on.

2. The apparatus of claim 1, wherein the voltage reference supply is a power supply.

3. The apparatus of claim 1, wherein the switch is operable to be closed or opened for calibrating the apparatus.

4. The apparatus of claim 1, wherein the first and second transistors configured to operate in weak inversion mode.

5. The apparatus of claim 1, wherein the first and second transistors are configured to form a differential pair.

6. The apparatus of claim 1, wherein the first and second transistors are configured to provide a PTAT signal.

7. The apparatus of claim 1, wherein the diode is configured to provide a CTAT signal on the first and second nodes.

8. The apparatus of claim 1, wherein
the first current passes through the first resistor, and
the second current passes through the third transistor.

9. The apparatus of claim 8, further comprising a current mirror wherein the second current is a mirror of current source.

10. The apparatus of claim 8 further comprises:
an amplifier including inputs coupled to nodes of the current mirror, and an output; and
a buffer including an input coupled to the output of the amplifier, and an output coupled to the first node.

11. The apparatus of claim 10, wherein the buffer comprises devices that coupled together provide a non-linear characteristic.

12. The apparatus of claim 1 further comprises a circuit configured to adjust resistance of the second resistor.

13. The apparatus of claim 12, wherein the circuit comprises a digital-to-analog converter (DAC).

14. A method for calibrating an apparatus, the method comprising:
determining a first digital code representing two unknown parameters by turning off a switch;
turning on the switch to couple a node to a known voltage reference to add known current to the node, the known current is subtracted from another current;
determining a second digital code representing the two unknown parameters when the switch is turned on using a result of the known current subtracted from another current;
computing a value of at least one of the unknown parameters using the known voltage, and the first and second digital code; and
calibrating the apparatus based on the computed value of at least one of the unknown parameters.

15. The method of claim 14, wherein the at least one of the unknown parameters is temperature coefficient of a diode.

16. The method of claim 15, wherein the first digital code is determined at an unknown temperature.

17. The method of claim 16, wherein the known current is added at the same unknown temperature, and wherein the known current changes operating point of the apparatus.

18. The method of claim 14 further comprises storing the computed value of the unknown parameter in a storage unit.

19. The method of claim 18 further comprises trimming the apparatus by adjusting components of the apparatus by the stored computed value.

20. The method of claim 14, wherein the apparatus comprises:
a first transistor with a gate terminal coupled to a first node and a current source;
a second transistor with a gate terminal coupled to a second node and ground;
a first resistor coupled to the first and second nodes;
a second resistor coupled to the first node and a reference voltage supply;
a diode coupled to the second node; and
a third resistor coupled to the second node and the voltage reference supply; and
wherein the switch is coupled to the third resistor and voltage reference supply and wherein a temperature is sensed by subtracting a first current form the first resistor with a second current from the third resistor at the first node when the switch is on.

21. A method comprising:
determining a first digital code representing 'N' number of unknown parameters;
coupling "N−1" number of different reference signals to a processing core by performing "N−1" separate measurement operations;
determining another "N−1" digital codes representing the 'N' unknown parameters by using a result of subtracting a known current with another current;
computing a value of at least one of the 'N' unknown parameters using the known "N−1" reference signals, and "N" number of digital codes; and
calibrating an apparatus, having the processing core, based on the computed value of the at least one of the 'N' unknown parameter, where 'N' is an integer.

22. The method of claim 21, wherein the apparatus is a thermal sensor, and the processing core includes a node of the thermal sensor.

23. The method of claim 21, wherein the 'N' unknown parameters include temperature and temperature coefficient.

\* \* \* \* \*